April 8, 1924.
A. W. DAVISON
1,489,347
PRODUCTION OF IRON AND STEEL
Filed May 1, 1920
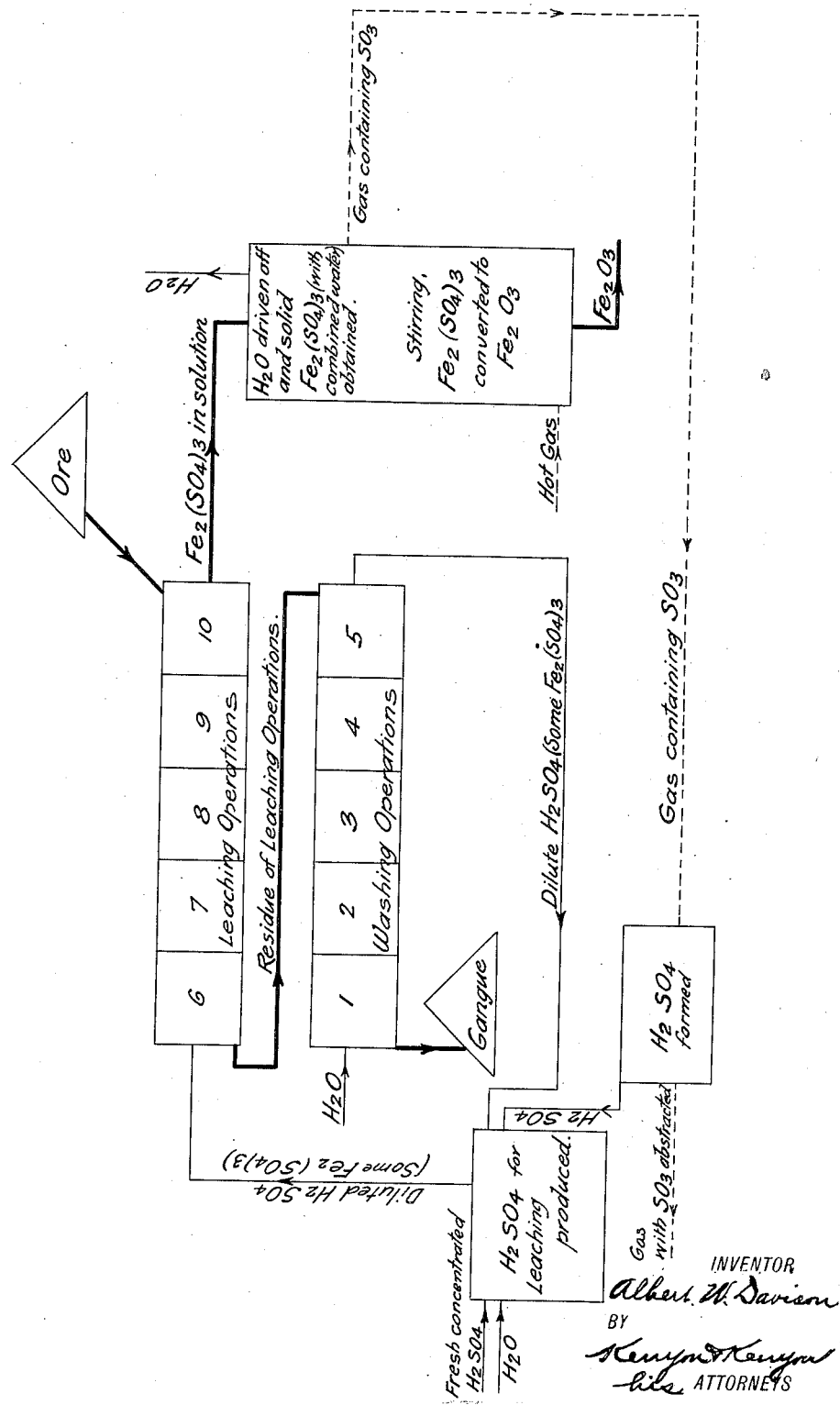
INVENTOR
Albert W. Davison
BY
Kenyon & Kenyon
his ATTORNEYS

Patented Apr. 8, 1924.

1,489,347

UNITED STATES PATENT OFFICE.

ALBERT W. DAVISON, OF PARR, VIRGINIA, ASSIGNOR, BY MESNE ASSIGNMENTS, TO J. P. LAFFEY, TRUSTEE, OF WILMINGTON, DELAWARE.

PRODUCTION OF IRON AND STEEL.

Application filed May 1, 1920. Serial No. 378,157.

*To all whom it may concern:*

Be it known that I, ALBERT W. DAVISON, a citizen of the United States, and a resident of Parr, in the county of Botetourt and State of Virginia, have invented certain new and useful Improvements in the Production of Iron and Steel, of which the following is a specification.

My invention relates generally to the production of iron and steel and more particularly to the production of an iron oxid from which iron or steel may be produced, this application being a substitute for and in part a continuation of my application Ser. No. 317,683, filed August 15, 1919.

The principal object of my invention is generally to provide a process whereby I may economically obtain from iron ores a relatively pure iron oxid from which high grade irons and steels may be produced in quantity more cheaply and uniformly than is now possible. My invention comprises a complete process to this end, and also certain novel subprocesses which I prefer to employ as parts of my complete process but which are not restricted to use therewith.

As a part of my complete process, iron ore is leached with a suitable acid, preferably sulfuric acid, to obtain in an efficient and economical way practical for commercial purposes an iron salt in solution. The leaching is effected under such conditions, including a suitable temperature and dilution of the acid, that the iron salt produced thereby, preferably ferric sulfate, is maintained in solution until separated from the silicious ingredients of the ore by drainage, thus avoiding any caking of any undissolved sulfate in the ore during the leaching operation. The residue of the ore after leaching is preferably washed to recover adherent leaching acid as well as the adherent solution of the iron salt, which latter is valuable because of the acid radical therein. As will appear more fully hereinafter, the leaching and washing in my process, as preferably carried out by me with successive batches or portions of ore and leaching and washing liquids, are effected in such a way as to lead to a very complete and efficient recovery of the iron salt in condition best suited for the subsequent treatment, preferably as a saturated and neutral solution of ferric sulfate, as well as the effective recovery of excess leaching acid.

My invention also contemplates an efficient conversion of the ferric sulfate obtained by leaching the ore with sulfuric acid into an iron oxid. I have found that a suitable hot gas, such as carbon monoxid, may be brought directly into contact with the ferric sulfate to very efficiently utilize the heat of such gas to convert the ferric sulfate into ferric oxid and sulfur trioxid without interfering with the subsequent conversion of the sulfur trioxid into sulfuric acid and its separation from the other gas mixed therewith.

My invention also contemplates the recovery and reformation for reuse in the most economical manner of the acid used for leaching.

The accompanying drawing is a diagram of the several steps of one way of practicing my complete process, the diagram showing the successive stages in the treatment of the iron containing material, as well as the recovery of the leaching acid.

I shall describe my invention on the assumption that the more usual iron ores are to be employed, namely: ores in which the iron is almost wholly in the form of an oxid, but in any case silica and other impurities in the accompanying gangue constitute a considerable portion of the ore. Before leaching the ore it may be desirable to crush it to bring it to a suitable size for most efficient and economical operation, after which some of the adherent clay or dirt is preferably removed in any suitable manner. When using sulfuric acid for leaching, I have found that good results are obtained if the ore is reduced to a one-quarter inch size as a maximum.

When sulfuric acid is used either cold or concentrated to leach out the iron content of the ore, even though the mass be agitated during the action of the acid, the operation is quite slow, the ferric sulfate which is formed tending to cake about the ore and interfere with the action of the acid. I have found that when the leaching operation is conducted with dilute hot sulfuric acid, preferably at or slightly under a boiling temperature, the operation can be efficiently and rapidly completed. I have found that good results can be obtained with sulfuric acid having a specific gravity from 1.35 to 1.45. As ferric sulfate is soluble in water and its solubility therein is increased by heat, both the dilution of the acid and the heating thereof render the acid more effective to keep the ferric sulfate in solution and thereby to keep the ore effectively exposed to the solvent action of the acid. Furthermore, the boiling of the acid serves to keep agitated any solid ferric sulfate that might be formed if the solution at any point in the leaching operation should be sufficiently strong in acid and ferric sulfate and thereby serves to prevent the caking of the ferric sulfate on the ore. To further increase the efficiency of the leaching operation, I preferably keep the ore agitated as by plowing or in any other suitable way, or I keep the acid in circulation through the mass, or both.

The ferric sulfate is next separated from the gangue containing the silicious ingredients of the ore. When the solution is kept sufficiently heated until after this separation to retain the ferric sulfate in solution, it may be readily drained from the gangue to effect a comparatively thorough separation of the ferric sulfate. The gangue is desirably washed to save adherent acid and ferric sulfate.

As noted above, I preferably carry out the leaching and washing steps of the process progressively on successive batches of ore or residue with successive batches or portions of acid and water or washing liquor, that is, each batch of the acid is first caused to leach ore which has had its iron content nearly leached out, then ore which has had its iron content less thoroughly leached out, and so on, being brought into contact with ore containing progressively higher percentages of iron, until finally the leaching solution is caused to leach fresh ore. In a similar way, each batch or portion of water or washing liquor is caused to act upon successive batches of the residue after the leaching liquor has been separated therefrom, the washing liquor becoming more and more concentrated in sulfuric acid. Each new batch of water is applied first to the most thoroughly washed residue and then successively to less thoroughly washed batches of residue.

The steps described above as well as their advantages will be more apparent by a reference to the accompanying diagram. In the diagram I have shown at the top a body of iron ore and that it is brought in successive batches to the leaching apparatus. Ten batches of ore or residue are shown, the batch which has received most treatment being numbered 1, that which has received the next amount of treatment No. 2, and so on, the batch of fresh ore being numbered 10. After the washing of batch 1, I have no further use for the residue or impurities constituting the gangue and they are discarded.

As shown in the diagram, five batches of iron containing material (Nos. 6–10), are being leached with sulfuric acid, batch 6 being material which has its iron content nearly removed, batches 7, 8, and 9 containing progressively more iron, and batch 10 being practically fresh ore. The free leaching acid enters the system at batch 6, where it effectually removes the remaining iron in that batch, thence it flows through batches 7, 8, and 9, where it unites with iron from the iron bearing material, removing same, and itself becoming more and more spent as it progresses, until lastly on flowing through batch 10, any free acid remaining is neutralized. From batch 10 this strong neutral solution of ferric sulfate is conducted to the suitable apparatus for carrying on the next step in my scheme. The other batches shown (1–5), which constitutes residues of ore after leaching, are being washed to recover adherent sulfuric acid and ferric sulfate therefrom. The wash water enters at batch 1, which batch has been washed longest, and which is nearly washed free of sulfuric acid and ferric sulfate, thence flows through batches, 2, 3, and 4, which have been previously washed progressively last, and which therefore contain progressively increasing amounts of sulfuric acid and ferric sulfate, whereby this wash water progressively contains more and more sulfuric acid and ferric sulfate until it enters batch 5, which has not been previously washed, and in which the washed liquor has its sulfuric acid and ferric sulfate content increased to a point where it is desirable to be strengthened with a more concentrated acid and used again for leaching. From batch 5 the wash liquor is conducted to a suitable storage tank. To ensure the efficient action of the acid on the ore, the leaching liquid is desirably agitated, as by circulating each batch of such liquor through the corresponding batch of ore, preferably from the bottom of the tank upwardly. The following distinct ends are thereby attained:

First, as the leaching solution comes last into contact with fresh ore, the free sulfuric acid therein will be very thoroughly spent in leaching this ore, so that there will result a solution of ferric sulfate which is substantially saturated and neutral.

Second, as the fresh sulfuric acid comes first into contact with ore which has had its iron contents very nearly leached out, there will result a very complete removal of the iron contents from the ore.

Third, as the last leaching of any batch is with fresh sulfuric acid, the washing of the somewhat difficulty removable ferric sulfate from the residue is simplified, the washing operation having reduced itself to the simple process of washing out sulfuric acid containing only a small percentage of ferric sulfate.

The leaching liquid is desirably maintained heated to the desired temperature as by heating the same before passing it into each leaching tank.

By the washing operation as described above a very complete recovery of the acid and ferric sulfate adhering to the silicious residue is obtained and the use of an excessively large amount of water is avoided.

It is to be understood that in practice it is not necessary to remove the various batches of ore and residue from one tank to another, as the successive leachings and washings may be effected by changing the circulation of the leaching and washing liquids to introduce them in proper order in the various tanks.

As the solution of ferric sulfate obtained by me is substantially neutral and saturated, there is little or no free sulfuric acid and only a relatively small amount of water to be driven off to convert the ferric sulfate into ferric oxid. The cost of the next step of my process is accordingly not as large as if more water and free sulfuric acid were present with the ferric sulfate.

As shown in the diagram, the ferric sulfate is next converted into ferric oxid. This is accomplished by the application of hot gas, preferably while the particles of sulfate are agitated as, for example, by the well-known Wedge furnace, to ensure the rapid and effective application of heat throughout the ferric sulfate while the hot gas is passed upwardly through and in contact with a downwardly descending stream of the ferric sulfate. I have found that no interference of any kind with the action occurs when the hot gas, such as carbon monoxid, carbon dioxid, or a mixture of the two is brought directly into contact with the ferric sulfate and with the ferric oxid and sulfur trioxid into which the ferric sulfate is converted; whereas, on the other hand, the heat is more effectively transferred to the ferric sulfate to decompose the same than is the case where the hot gas is not passed directly through the chamber containing the ferric sulfate. At the same time expensive apparatus with separate flues for the heating gas is avoided. If desired, some of the carbon monoxid may be burned to increase the heat of the gases. The ferric oxid is obtained in the form of a fine powder and contains practically all of the iron that was in the iron ore.

Considering more in detail the reactions which take place at this stage of my process, the thick syrupy solution of ferric sulfate from the leaching operation is first heated to drive off water and produce solid ferric sulfate. This may be done in what is commonly known as the "preheating bench" of the Wedge furnace, the water vapor being permitted to escape to the atmosphere and the ferric sulfate dropping downwardly in the furnace where it is stirred or agitated and heated by the hot gas brought into contact therewith. The heating of the ferric sulfate, which may still contain a certain amount of combined water, first causes this water to be driven off and then causes the ferric sulfate to be converted into ferric oxid by driving off the sulfur trioxid. The later and also the water vapor produced by driving off the combined water from the ferric sulfate are led off together with the carbon monoxid or other heating gas for treatment as hereinafter described.

If it is desired to produce iron or steel from the ferric oxid powder, the latter may be reduced to iron and then treated to remove impurities and ingredients added to produce any desired alloy. The method employed in application Serial No. 368,859, filed by Arthur J. Moxham on March 26, 1920 may advantageously be employed to this end.

The gas from the operation in which the ferric sulfate is converted to ferric oxid is still quite hot, and some of the sensible heat may be abstracted therefrom not only for the practical utilization of this heat but also to bring the gas to a cooler condition for effectively separating the sulfur trioxid therefrom as hereinafter described.

The sulphur trioxid gas driven off during the conversion of ferric sulfate to ferric oxid is converted, as shown by the diagram into sulfuric acid. This may be readily accomplished by passing the hot gas after the abstraction of heat therefrom as described through a strong solution of $H_2SO_4$ by which sulfur trioxid is abstracted, as well known in the art. There is no interference with this step by the carbon monoxid or other hot gas mixed with the sulfur trioxid, the gases other than the sulfur trioxid passing through the strong sulfuric acid so that if desired they may be used for any suitable purpose.

In the formation of the sulfuric acid from the sulfur trioxid gas, the latter is passed through a spray of strong sulfuric acid until there is obtained an acid of substantially greater strength than that used for leaching, for example, until it has a specific gravity of about 1.6 or 1.7. This acid is, as shown, mixed with the dilute acid obtained from the washing operations, and if desirable also with fresh concentrated acid or water, until an acid of suitable strength for leaching is obtained, which acid for leaching is of lower specific gravity than the concentrated acid. The resultant acid after being heated to the desired temperature is then desirably used again as fresh acid for the leaching operation. In this way, the sulfuric acid is effectively conserved.

It is to be understood that the specific process described is merely illustrative of my invention, and that changes within the scope of the appended claims may be made without departing from the invention.

Having described my invention, what I claim as new and desire to secure by Letters Patent is:

1. The process of extracting iron from its ores which comprises treating the ore with a hot acid of suitable strength to form a solution of an iron salt and to maintain the iron salt in solution while separating the solution from the silicious contents of the ore, and converting the iron salt thus obtained into an oxid of iron.

2. The process of extracting iron from its ores which comprises treating the ore with hot sulfuric acid of suitable strength to form a solution of ferric sulfate and to maintain the ferric sulfate in solution while separating it from the silicious contents of the ore, and converting the ferric sulfate into an oxid of iron.

3. The process of extracting iron from its ores which comprises treating the ore with dilute sulfuric acid, at approximately a boiling temperature, to form a solution of ferric sulfate and to maintain the ferric sulfate in solution while separating it from the silicious contents of the ore, and converting the ferric sulfate into an oxid of iron.

4. The process of extracting iron from its ores which comprises treating the ore with dilute sulfuric acid, at approximately a boiling temperature, having a specific gravity from 1.35 to 1.45, to form a solution of ferric sulfate and to maintain the ferric sulfate in solution while separating it from the silicious contents of the ore, and converting the ferric sulfate into an oxid of iron.

5. The process of extracting iron from its ores which comprises treating the ore with hot sulfuric acid of suitable strength to form a solution of ferric sulfate and to maintain the ferric sulfate in solution while separating it from the silicious contents of the ore, and converting the ferric sulfate into an oxid of iron, by driving off sulfur trioxid with application of heat.

6. The process of extracting iron from its ores, which comprises leaching the ore with dilute sulfuric acid at approximately the boiling temperature thereof, whereby the ore is maintained effectively exposed to the solvent action of the acid and the ferric sulfate produced is maintained in solution, and separating the solution of ferric sulfate from the silicious ingredients of the ore.

7. The process of extracting iron from its ores which comprises leaching the ore with hot dilute sulfuric acid to form a solution of ferric sulfate, separating the ferric sulfate from the silicious contents of the ore while the ferric sulfate is maintained in solution, and washing the silicious contents of the ore to recover sulfuric acid therefrom.

8. The process of extracting iron from its ores which comprises leaching the ore with hot dilute sulfuric acid to form a solution of ferric sulfate, separating the ferric sulfate from the silicious contents of the ore while the ferric sulfate is maintained in solution, washing the silicious contents of the ore to recover sulfuric acid therefrom, heating the ferric sulfate to convert the same into ferric oxid and sulfur trioxid, converting the sulfur trioxid into sulfuric acid and mixing the sulfuric acid with the liquor from the washing operation to produce sulfuric acid of suitable strength for leaching the ore.

9. The process of extracting iron from its ores which comprises leaching the ore with hot sulfuric acid to form a substantially saturated and neutral solution of ferric sulfate, separating the ferric sulfate from the silicious contents of the ore while the ferric sulfate is maintained in solution, and decomposing the ferric sulfate by heat to produce ferric oxid.

10. The process of extracting iron from its ores which comprises leaching successive batches of ore with sulfuric acid of such strength and at such a temperature as will maintain the resultant ferric sulfate in solution for its separation from the residue, fresh sulfuric acid being introduced for leaching to the batch of ore which has been leached most and the sulfuric acid and ferric sulfate in solution from each batch being introduced for leaching to a batch of ore which has been leached less until fresh ore has been leached.

11. The process of extracting iron from its ores which comprises leaching successive batches of ore with sulfuric acid of such strength and at such a temperature as will maintain the resultant ferric sulfate in solution for its separation from the residue, fresh sulfuric acid being introduced for leaching to the batch of ore which has been leached most and the sulfuric acid and ferric sulfate in solution from each batch being introduced for leaching to a batch of ore which has been leached less until fresh ore has been leached and a substantially saturated and neutral solution of ferric sulfate is obtained.

12. The process of extracting iron from its ores which comprises leaching successive batches of ore with sulfuric acid of such strength and at such a temperature as will maintain the resultant ferric sulfate in solution for its separation from the residue, washing successive batches of residue each with successive portions of liquid, the last of which is fresh water and each preceding portion of which is the wash liquid from a more thoroughly washed batch of residue.

13. The process of extracting iron from its ores which comprises leaching successive batches of ore with sulfuric acid of such strength and at such a temperature as will maintain the resultant ferric sulfate in solution for its separation from the residue, fresh sulfuric acid being introduced for leaching to the batch of ore which has been leached most and the sulfuric acid and ferric sulfate in solution from each batch being introduced for leaching to a batch of ore which has been leached less until fresh ore has been leached and a substantially saturated and neutral solution of ferric sulfate has been obtained, washing successive batches of residue each with successive portions of liquid, the last of which is fresh water and each preceding portion of which is the wash liquid from a more thoroughly washed batch of residue, and separating the ferric sulfate from solution.

14. The process of extracting iron from its ores which comprises leaching successive batches of ore with sulfuric acid of such strength and at such a temperature as will maintain the resultant ferric sulfate in solution for its separation from the residue, fresh sulfuric acid being introduced for leaching to the batch of ore which has been leached most and the sulfuric acid and ferric salt in solution from each batch being introduced for leaching to a batch of ore which has been leached less until fresh ore has been leached and a substantially saturated and neutral solution of ferric sulfate has been obtained, washing successive batches of residue each with successive portions of liquid, the last of which is fresh water and each preceding portion of which is the wash liquid from a more thoroughly washed batch of residue, separating the ferric sulfate from solution, converting the ferric sulfate to ferric oxid and sulfur trioxid, and converting the sulfur trioxid to sulfuric acid and mixing the same with the liquor from the washing operation to produce sulfuric acid of suitable strength for leaching the ore.

In testimony whereof, I have signed my name to this specification.

ALBERT W. DAVISON.